United States Patent
Qavi et al.

(10) Patent No.: US 11,433,359 B1
(45) Date of Patent: Sep. 6, 2022

(54) ANTIMICROBIAL FILTRATION MEMBRANES

(71) Applicant: Arrowhead Center, Inc., Las Cruces, NM (US)

(72) Inventors: Sahar Qavi, Las Cruces, NM (US); Reza Foudazi, Las Cruces, NM (US); Aaron Lindsay, Saint Paul, MN (US)

(73) Assignee: Arrowhead Center, Inc., Las Cruces, NM (US)

( * ) Notice: Subject to any disclaimer, the term of this patent is extended or adjusted under 35 U.S.C. 154(b) by 0 days.

(21) Appl. No.: 16/261,496

(22) Filed: Jan. 29, 2019

Related U.S. Application Data

(60) Provisional application No. 62/623,321, filed on Jan. 29, 2018.

(51) Int. Cl.
*B01D 69/12* (2006.01)
*C08L 33/14* (2006.01)
(Continued)

(52) U.S. Cl.
CPC ........... *B01D 69/125* (2013.01); *A01N 37/44* (2013.01); *B01D 67/0006* (2013.01);
(Continued)

(58) Field of Classification Search
CPC ...... B01D 69/125; B01D 69/02; B01D 71/40; B01D 71/52; B01D 71/80; B01D 2323/08; B01D 2323/24; B01D 67/0006
(Continued)

(56) References Cited

U.S. PATENT DOCUMENTS

| 5,006,287 A * | 4/1991 | Davis ................ | B01D 67/0011 264/41 |
| 5,529,690 A * | 6/1996 | Pashley ............... | B01D 69/10 210/490 |

(Continued)

FOREIGN PATENT DOCUMENTS

| DE | 60021407 T2 | 8/2005 |
| DE | 60218347 T2 | 4/2007 |

(Continued)

OTHER PUBLICATIONS

Alexandridis, Paschalis, et al., "A Record Nine Different Phases (Four Cubic, Two Hexagonal, and One Lamellar Lyotropic Liquid Crystalline and Two Micellar Solutions) in a Ternary Isothermal System of an Amphiphilic Block Copolymer and Selective Solvents (Water and Oil)", Langmuir, 14, 1998, 2627-2638.
(Continued)

*Primary Examiner* — Brian K Talbot
(74) *Attorney, Agent, or Firm* — Peacock Law P.C.; Philip D. Askenazy

(57) ABSTRACT

A method for in situ production of antimicrobial filtration membranes that uses self-assembly of surfactants such as block copolymers as a template. The mesophase structure (for example hexagonal or lamellar) can be determined, and membrane pore size can be controlled in the nanometer range, by changing the block copolymer and the amounts of the components such as the block copolymer, aqueous solution, monomer, crosslinker, and initiator. The monomer phase cures in the template and there is no need for organic solvents and coagulation bath or other post-modification. As-synthesized membranes were found to have pore sizes with a narrow size distribution in the range of 3-4 nm with a molecular weight cutoff of 1500 g/mol and displayed both excellent fouling resistance and high permeance of water, vastly outperforming a conventional NIPS UF membrane.
(Continued)

The monomer can comprise a quaternary ammonium group so that the membrane is antibacterial. The block copolymer can comprise hydrophilic blocks which form the surfaces of the membrane pores, rendering them hydrophilic.

26 Claims, 12 Drawing Sheets

(51) Int. Cl.
| | |
|---|---|
| A01N 37/44 | (2006.01) |
| B01D 67/00 | (2006.01) |
| B01D 69/02 | (2006.01) |
| B01D 71/80 | (2006.01) |
| B01D 71/52 | (2006.01) |
| B01D 71/40 | (2006.01) |

(52) U.S. Cl.
CPC ............ *B01D 69/02* (2013.01); *B01D 71/40* (2013.01); *B01D 71/52* (2013.01); *B01D 71/80* (2013.01); *C08L 33/14* (2013.01); *B01D 2323/08* (2013.01); *B01D 2323/24* (2013.01); *B01D 2323/345* (2013.01); *B01D 2323/40* (2013.01); *B01D 2325/36* (2013.01); *B01D 2325/48* (2013.01)

(58) Field of Classification Search
USPC ........................................................ 427/243
See application file for complete search history.

(56) References Cited

U.S. PATENT DOCUMENTS

| | | | |
|---|---|---|---|
| 6,039,913 | A | 3/2000 | Hirt et al. |
| 6,264,741 | B1* | 7/2001 | Brinker .................. B82Y 30/00 |
| | | | 117/11 |
| 6,395,792 | B1 | 5/2002 | Nagasuna et al. |
| 6,488,872 | B1 | 12/2002 | Beebe et al. |
| 6,592,991 | B1* | 7/2003 | Wiesner .................. B01D 71/00 |
| | | | 428/404 |
| 6,723,814 | B2 | 4/2004 | Meier et al. |
| 6,838,078 | B2 | 1/2005 | Lu et al. |
| 6,872,241 | B2 | 3/2005 | Soane et al. |
| 7,736,689 | B2 | 6/2010 | Chappa et al. |
| 8,034,444 | B2 | 10/2011 | Itami et al. |
| 8,329,767 | B2 | 12/2012 | Highgate |
| 8,808,807 | B2* | 8/2014 | Chmelka ............ B01D 67/0048 |
| | | | 427/243 |
| 8,993,052 | B2 | 3/2015 | Chen et al. |
| 10,259,723 | B2 | 4/2019 | Brozell et al. |
| 2002/0102674 | A1* | 8/2002 | Anderson .................. A61F 2/14 |
| | | | 435/174 |
| 2007/0287104 | A1* | 12/2007 | Doshi .................... G03F 7/0047 |
| | | | 430/322 |
| 2008/0193735 | A1* | 8/2008 | Hessing ................ B41M 5/5209 |
| | | | 428/304.4 |
| 2009/0107922 | A1* | 4/2009 | Zhang .................. B01D 69/105 |
| | | | 210/749 |
| 2009/0173693 | A1* | 7/2009 | Gin ..................... B01D 67/0006 |
| | | | 210/650 |
| 2009/0208677 | A1* | 8/2009 | Itami ........................ B41M 5/52 |
| | | | 428/221 |
| 2010/0040861 | A1 | 2/2010 | Addiego et al. |
| 2010/0096327 | A1* | 4/2010 | Gin .......................... C02F 1/441 |
| | | | 210/637 |
| 2011/0046074 | A1 | 2/2011 | Kumar et al. |
| 2011/0284456 | A1 | 11/2011 | Brozell |
| 2013/0112613 | A1 | 5/2013 | Kang et al. |
| 2013/0323419 | A1* | 12/2013 | Chang .................. B01D 63/066 |
| | | | 427/243 |
| 2014/0048477 | A1 | 2/2014 | Kang et al. |
| 2014/0147390 | A1* | 5/2014 | Exner .................. A61K 9/1271 |
| | | | 424/9.52 |
| 2015/0136690 | A1* | 5/2015 | Xie ....................... B01D 69/142 |
| | | | 210/500.3 |
| 2015/0202577 | A1* | 7/2015 | Freese ................ B01D 39/1692 |
| | | | 96/12 |
| 2015/0290595 | A1* | 10/2015 | Reddy ..................... B01D 71/56 |
| | | | 210/489 |
| 2015/0321149 | A1* | 11/2015 | McGinnis ............... B29C 66/40 |
| | | | 264/413 |
| 2015/0343396 | A1* | 12/2015 | Aamer ................... B01D 69/02 |
| | | | 210/500.33 |
| 2017/0014780 | A1 | 1/2017 | Birss et al. |
| 2017/0182477 | A1* | 6/2017 | Fuchigami ............... B01J 20/26 |
| 2017/0282128 | A1 | 10/2017 | Berzinis et al. |
| 2017/0368508 | A1 | 12/2017 | Grossman et al. |
| 2018/0161733 | A1 | 6/2018 | Jeong et al. |
| 2018/0208728 | A1* | 7/2018 | Gin ........................... C08J 9/36 |

FOREIGN PATENT DOCUMENTS

| | | |
|---|---|---|
| EP | 1214630 A2 | 6/2002 |
| EP | 1362907 A2 | 11/2003 |
| EP | 1228102 B1 | 7/2005 |
| EP | 1465740 A4 | 6/2006 |
| EP | 1463576 B1 | 2/2007 |
| KR | 101561503000 | 10/2015 |
| KR | 1016230350000 | 5/2016 |
| WO | 2018204862 | 11/2018 |

OTHER PUBLICATIONS

Alexandridis, Paschalis , et al., "Self-Assembly of Amphiphilic Block Copolymers: The (EO)13(PO)30(EO)13-Water-p-Xylene System", Macromolecules, 28, 1995, 7700-7710, no month available.

Ayfer, Burcu , et al., "Synthesis and antibacterial activities of new quaternary ammonium monomers", Designed Monomers and Polymers, 8:5, 2005, 437-451, no month available.

Batra, Dolly, et al., "The Effect of Cation Structure on the Mesophase Architecture of Self-Assembled and Polymerized Imidazolium-Based Ionic Liquids", Macromolecular Chemistry and Physics, 208, 2007, 1416-1427, no month available.

Bengani, Prity , et al., "Zwitterionic copolymer self-assembly for fouling resistant, high flux membranes with size-based small molecule selectivity", Journal of Membrane Science, 493, 2015, 755-765, no month available.

Bragg, W. H., et al., "The Reflection of X-rays by Crystals", Proceedings of the Royal Society of London, 88, Jul. 1913, 428-438.

Cantwell, R. E., et al., "Interactions between humic matter and bacteria when disinfecting water with UV light", Journal of Applied Microbiology, 105, 2008, 25-35, no month available.

Cassano, A., et al., "Clarification of blood orange juice by ultrafiltration: analyses of operating parameters, membrane fouling and juice quality", Desalination, 212, 2007, 15-27, no month available.

Colson, Colleen D., et al., "Photopolymerization of Lyotropic Liquid Crystalline Systems: A New Route to Nanostructured Materials", Materials Research Society Symposium Proc., vol. 709, 2002, CC9.5.1-CC9.5.6, no month available.

Davey, Christopher John, et al., "Molecular weight cut-off determination of organic solvent nanofiltration membranes using poly(propylene glycol)", Journal of Membrane Science, 526, 2017, 221-228, no month available.

Dorin, Rachel Mika, et al., "Designing Block Copolymer Architectures for Targeted Membrane Performance", Polymer (unedited manuscript accepted for publication), 2013, no month available.

Foudazi, Reza , et al., "Physical chemistry of highly concentrated emulsions", Advances in Colloid and Interface Science, 220, Mar. 23, 2015, 78-91.

Garcia-Ivars, Jorge , et al., "Comparison between hydrophilic and hydrophobic metal nanoparticles on the hase separation phenomena during formation of assymmetric polyethersulphone membranes", Journal of Membrane Science, 493, 2015, 709-722, no month available.

(56) References Cited

OTHER PUBLICATIONS

Guillen, Gregory R., et al., "Preparation and Characterization of Membranes Formed by Nonsolvent Induced Phase Separation: A Review", Industrial & Engineering Chemistry Research, 50, 2011, 3798-3817, no month available.

Guymon, C. Allan, et al., "Kinetic Analysis of Polymerization Rate Acceleration During the Formation of Polymer/Smectic Liquid Crystal Composites", Macromolecules, 30, 1997, 5271-5278, no month available.

Hatakeyama, Evan S., et al., "Nanoporous, Bicontinuous Cubic Lyotropic Liquid Crystal Networks via Polymerizable Gemini Ammonium Surfactants", Chemistry of Materials, 22, 2010, 4525-4527, no month available.

Hentze, Hans-Peter, et al., "Polymerization of and within self-organized media", Current Opinion in Colloid and Interface Science, 8, 2003, 164-178, no month available.

Holmqvist, Peter, et al., "Modification of the Microstructure in Block Copolymer-Water-"Oil" Systems by Varying the Copolymer Composition and the "Oil" Type: Small-Angle X-ray Scattering and Deuterium—NMR Investigation", The Journal of Physical Chemistry B, 102, 1998, 1149-1158, no month available.

Hucknall, Angus, et al., "In Pursuit of Zero: Polymer Brushes that Resist the Adsorption of Proteins", Advanced Materials, 21, 2009, 2441-2446, no month available.

Irwin, Matthew T., et al., "Structure-Conductivity Relationships in Ordered and Disordered Salt-Doped Diblock Copolymer/Homopolymer Blends", Macromolecules, 49, 2016, 6928-6939, month available.

Jeon, S. I., et al., "Protein-Surface Interactions in the Presence of Polyethylene Oxide", Journal of Colloid and Interface Science, vol. 142, Mar. 1, 1991, 149-158.

Langford, J. I., et al., "Scherrer after Sixty Years: A Survey and Some New Results in the Determination of Crystallite Size", Journal of Applied Crystallography, 11, 1978, 102-113, no month available.

Lester, Christopher L., et al., "Photopolymerization Kinetics and Structure Development of Templated Lyotropic Liquid Crystalline Systems", Macromolecules, 34, 2001, 4430-4438, no month available.

Lester, Christopher L., et al., "Physical Properties of Hydrogels Synthesized from Lyotropic Liquid Crystalline Templates", Chemistry of Materials, 15, 2003, 3376-3384, no month available.

Li, Qian, et al., "A novel ultrafiltration (UF) membrane with controllable selectivity for protein separation", Journal of Membrane Science, 427, 2013, 155-167, no month available.

Lin, Jiuyang, et al., "Tight ultrafiltration membranes for enhanced separation of dyes and Na2SO4 during textile wastewater treatment", Journal of Membrane Science, 514, 2016, 217-228, no month available.

Ma, Yanli, et al., "Enhanced anti-ultraviolet, anti-fouling and anti-bacterial polyelectrolyte membrane of polystyrene grafted with trimethyl quaternary ammonium salt modified lignin", Polymer, 114, Feb. 28, 2017, 113-121.

Park, Sung Yong, et al., "Anti-scaling ultrafiltration/microfiltration (UF/MF) polyvinylidene flouride (PVDF) membranes with positive surface chrages for Ca2+/silica-rich wastewater treatment", Journal of Membrane Science, 480, 2015, 122-128, no month available.

Pieracci, John, et al., "Photochemical modification of 10 kDa polyethersulfone ultrafiltration membranes for reduction of biofouling", Journal of Membrane Science, 156, 1999, 223-240, no month available.

Qavi, Sahar, et al., "Elasticity of Self-Assembled Block Copolymers in Water and Oil Mixtures", Bulletin of the Amercian Physical Society, APS March Meeting 2019, Abstract: R49.00001, 2019, no month available.

Qavi, Sahar, et al., "Mesophase Templated Porous Polymers as Ultrafiltration Membrane", Desalination & Water Purification Research and Development Program; 2011-2015 Final Report—Cooperative Agreement No. R10AC80283 (Prepared for Reclamation), 2015, 833-895, no month available.

Rektor, Attila, et al., "Membrane filtration of Mozzarella whey", Desalination, 162, 2004, 279-286, no month available.

Sax, J., et al., "Modeling of Transport of Small Molecules in Polymer Blends: Application of Effective Medium Theroy", Polymer Engineering and Science, vol. 23, No. 3, 1983, 165-176, no month available.

Seo, Myungeun, et al., "Reticulated Nanoporous Polymers by Controlled Polymerization-Induced Microphase Separation", Science, 336, Jun. 15, 2012, 1422-1425.

Srisiri, Warunee, et al., "Polymerization of the Inverted Hexagonal Phase", Journal of the American Chemical Society, 119, 1997, 4866-4873, no month available.

Susanto, Heru, et al., "Characteristics, performance and stability of polyethersulfone ultrafiltration membranes prepared by phase separation method using different macromolecular additives", Journal of Membrane Science, 327, 2009, 125-135, no month available.

Svensson, Birgitta, et al., "Self-Assembly of Block Copolymers in Selective Solvents: Influence of Relative Block Size on Phase Behavior", Langmuir, 16, 2000, 6839-6846, no month available.

Wang, Zhongni, et al., "Hexagonal Liquid Crystalline Phases Formed in Ternary Systems of Brij 97-Water-Ionic-Liquids", Langmuir, 21, 2005, 4931-4937, no month available.

Wang, Da-Ming, et al., "Recent advances in preparation and morphology control of polymeric membranes formed by nonsolvent induced phase separation", Current Opinion in Chemical Engineering, 2, 2013, 229-237, no month available.

Xue, Yan, et al., "Antimicrobial Polymeric Materials with Quaternary Ammonium and Phosphonium Salts", International Journal of Molecular Sciences, 16, 2015, 3626-3655, no month available.

Zhou, Jinxiang, et al., "Mechanisms and control of fouling during ultrafiltration of high strength wastewater without pretreatment", Journal of Membrane Science, 488, 2015, 103-110, no month available.

Zhou, Meijuan, "New Type of Membrane Material for Water Desalination Based on a Cross-Linked Bicontinuous Cubic Lyotropic Liquid Crystal Assembly", Journal of the American Chemical Society, 129, 2007, 9574-9575, no month available.

Zhou, Meijuan, et al., "Supported Lyotropic Liquid-Crystal Polymer Membrances: Promissing Materials for Molecular-Size-Selective Aqueous Nanofiltration", Advanced Materials, vol. 17, WILEY-VCH Verlag CmbH & Co., Weinheim, 2005, 1850-1853, no month available.

\* cited by examiner

ANTIMICROBIAL FILTRATION MEMBRANES

CROSS-REFERENCE TO RELATED APPLICATIONS

This patent application claims priority to and the benefit of the filing of U.S. Provisional patent application No. 62/623,321, filed on Jan. 29, 2018, entitled "Antimicrobial Filtration Membranes", and the specification and claims thereof and appendices thereto are incorporated herein by reference.

FEDERALLY SPONSORED RESEARCH OR DEVELOPMENT

The U.S. Government has a paid-up license in this invention and the right in limited circumstances to require the patent owner to license others on reasonable terms as provided for by the terms of Cooperative Agreement No. R10AC80283 awarded by the United States Bureau of Reclamation.

BACKGROUND OF THE INVENTION

Field of the Invention (Technical Field)

The present invention is related to a process for the production of antimicrobial filtration membranes using a templating approach and in situ formation of a mesoporous polymer, and membranes produced thereby.

BACKGROUND ART

Note that the following discussion may refer to a number of publications and references. Discussion of such publications herein is given for more complete background of the scientific principles and is not to be construed as an admission that such publications are prior art for patentability determination purposes.

Ultrafiltration (UF) and microfiltration (MF) are among the most commonly employed separation techniques with applications in a variety of industries ranging from food processing to chemical manufacturing and protein purification. In the treatment of water and wastewater, UF and/or MF play a key role in the removal of suspended particles, viruses, and bacteria. Conventionally, these membranes are produced by non-solvent induced phase separation (NIPS), a method that is environmentally questionable due to its use of large quantities of organic solvent, approximately 70% (by volume). Additionally, NIPS membranes are anisotropic with low surface porosity, leading to increased fouling on the surface of the membrane. Bio-fouling is a common problem found in membrane filtration as proteins, bacteria, and viruses accumulate on the surface of membranes. As a result, there has been a great deal of effort to develop improved UF membranes via modification of the NIPS method and resultant membranes as well as the development of alternative UF membrane production routes.

The most common approach taken in the development of improved UF membranes has been surface modification. Grafting hydrophilic groups, such as poly(ethylene glycol), to the surface of membranes has been proven to reduce fouling. However, surface modification is costly. Another approach, a combination of polymer self-assembly and NIPS, referred to as SNIPS, affords resultant membranes with high flux and anti-fouling properties. In this method, immersion of a self-assembled block copolymer film in a non-solvent bath leads to the formation of hierarchically porous membranes. However, the SNIPS method still requires large quantities of organic solvent and, as such, is not eco-friendly. Templating is an alternative route to porous membranes in which a structured or porous material is used as a template to impart structure to another material and subsequently removed. Consequently, the pore size and pore size distribution can be readily controlled by changing the template. Surface-active agents (surfactants) can self-assemble in water/oil mixtures to form anisotropic, mesomorphic phases (mesophases) exhibiting high extension in one or two dimensions, making them ideal templates for membranes. These mesophase templates are thermodynamically stable systems with length scales on the order of 2-50 nm, and can be prepared through polymerization of mesoporous polymers. A critical problem observed in this templating approach is polymerization-induced phase separation/inversion in which the template structure is not retained after polymerization. The use of amphiphilic block copolymers as surfactants has been shown to improve the retention of the template structure due to the slow kinetics of block copolymers. However, most of the reported lyotropic liquid crystal (LLC) templating techniques found to retain the LLC structure after polymerization require polymerizable surfactants prepared via complex chemistries.

In addition, bio-fouling is a common problem found in membrane filtration as proteins, bacteria, and viruses accumulate on the surface of membranes. Currently, chlorination is utilized in municipal water systems to remove tiny microorganisms and bacteria. However, harmful disinfection byproducts produced during the chlorination process have raised concerns and motivated exploration of other disinfection agents. Therefore, if combined with disinfection, ultrafiltration and microfiltration can transform not only municipal water treatment, but also the treatment of wastewater containing harmful micro-organisms and bacteria due to their high flux rate and efficiency. In recent years, antibacterial membranes have attracted industrial and academic interest for the removal of bacteria and micro-organisms from water. Conventionally, antibacterial membranes are prepared through surface modification, but most surface modification routes are limited to specific types of membranes. Furthermore, these routes require the use of complex and often expensive chemical reactions to graft antibacterial groups onto the surface, making the final product costly.

SUMMARY OF THE INVENTION (DISCLOSURE OF THE INVENTION)

The present invention is a method of manufacturing a membrane, the method comprising mixing a surfactant, an aqueous solution, and a monomer solution to form a mesophase; coating the mesophase on a porous support; and polymerizing the mesophase to form a porous membrane. The porous support is preferably nonwoven. The method is preferably performed without the use of an organic solvent. The method preferably further comprises removing the aqueous solution after the polymerizing step. The monomer solution preferably comprises a monomer, a crosslinker and an initiator. The monomer is preferably functionalized with an antibacterial group, which preferably comprises a quaternary ammonium group. The initiator is preferably a thermal initiator or a photo-initiator. The surfactant preferably comprises a block copolymer. The block copolymer preferably is a block copolymer of poly(ethylene oxide) and poly(propylene oxide). The block copolymer preferably comprises hydrophilic blocks and hydrophobic blocks. The hydrophilic blocks preferably form the surfaces of pores in the membrane. The surfactant preferably does not comprise a small molecule surfactant. The aqueous solution is optionally deionized water. The mixing step is optionally performed via centrifugation. The polymerizing step preferably comprises exposing the mesophase to ultraviolet radiation and/or heating the mesophase to a temperature below 100° C. for less than 5 hours. The membrane is preferably antibacterial. The method preferably comprises choosing relative amounts of the surfactant, the aqueous solution, and the monomer solution in order to produce a desired structure of the mesophase, such as hexagonal or lamellar. The method optionally further comprises hot pressing the mesophase and the support to infuse the mesophase into the support prior to the polymerization step. The pore size of the membrane is preferably less than approximately 5 nm. The average grain size of the membrane is preferably approximately 100 nm. The membrane preferably comprises monodisperse pores and/or is isoporous. The surfaces of the pores are preferably hydrophilic.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate the practice of embodiments of the present invention and, together with the description, serve to explain the principles of the invention. The drawings are only for the purpose of illustrating certain embodiments of the invention and are not to be construed as limiting the invention. In the figures:

FIG. 9A shows the 50/35/15 composition before polymerization; FIG. 9B shows the 50/35/15 composition after polymerization; FIG. 9C shows the 55/15/30 composition before polymerization; and FIG. 9D shows the 55/15/30 composition after polymerization.

DETAILED DESCRIPTION OF EMBODIMENTS OF THE INVENTION

Figure 1:
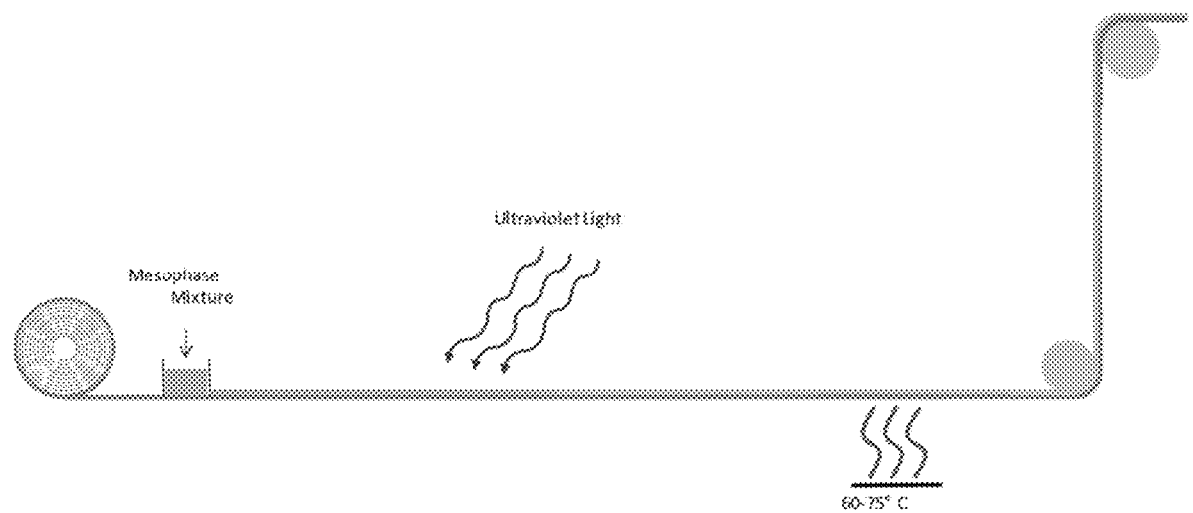
FIG. 1 is a schematic representation of an antimicrobial membrane production line of the present invention.

Embodiments of the present invention are methods for preferably one step production of UF and MF antimicrobial filtration membranes via in situ polymerization of one or more functionalized monomers that preferably use self-assembly of block copolymers as a template. Membrane pore sizes can be controlled in the range of 2-50 nm by changing the block copolymer and the ratio of components. The monomer phase cures in the template and there is no need for organic solvents or a coagulation bath. The membranes can be scaled-up for industrial purposes as well as adapted in small portable units for production in rural areas and small communities. The templating approach provides improved permeability over other methods, and enables flexibility in producing membranes with different chemistries and mechanical properties. The characteristics of final membranes may be varied depending on the composition and characteristics of the components. Antimicrobial membranes produced from the method of the present invention are useful for municipal water and wastewater treatment facilities, food industries, biomedical applications, and pharmaceutical industries. The membranes of the present invention preferably do not comprise silver nanoparticles.

The template preferably comprises three main components: a surfactant phase, an aqueous phase, and an organic or oil phase. In general, the monomer phase (which may be the organic/oil or aqueous phase) preferably comprises mixtures of monomers, crosslinkers, and thermal and/or photo initiators. Preferably no organic solvent is necessary to produce membranes of the present invention. The surfactant phase preferably comprises approximately from 20-80 wt %, more preferably approximately from 30-70 wt %, and most preferably approximately from 50-60 wt % of the mixture. The aqueous phase (such as water) preferably comprises approximately 0-40 wt %, more preferably approximately from 10-35 wt %, and most preferably approximately from 15-30 wt % of the mixture. The oil phase preferably comprises a monomer that is liquid at the mixing temperature and pressure, as well as one or more crosslinkers and one or more initiators, preferably comprises the remainder of the mixture, that is preferably approximately from 1-80 wt %, more preferably approximately from 5-60 wt %, and most preferably approximately from 10-35 wt % of the mixture. The oil or organic phase preferably comprises a crosslinker approximately from 10-100 wt %, more preferably approximately from 20-60 wt %, and most preferably approximately from 30-50 wt % of the oil phase. An initiator preferably comprises approximately from 0.1-10 wt %, more preferably approximately from 1-5 wt %, and most preferably approximately from 3-5 wt %. The remainder of the oil phase preferably comprises the monomer; that is preferably approximately from 1-90 wt %, more preferably approximately from 35-80 wt %, and most preferably approximately from 45-67 wt %.

Monomers, crosslinkers, and initiators can be incorporated in one or more of the phases. The surfactant may comprise one or more amphiphilic block copolymers with different functional groups. The block ratio may differ in the block copolymer that leads to different pore size in the final membrane. The aqueous to organic phase ratio and block copolymer can each be varied to form different mesostructures. Templates can be formed at different temperatures. The block copolymer is preferably commercially available and self-assembles in the presence of two selective solvents (e.g. water and a monomeric phase); at the end, only the water is preferably removed. Therefore, no complicated etching or degradation step is needed.

Alkyl acrylates or alkyl methacrylates monomers, such asethylhexyl acrylate, butyl acrylate, hexyl acrylate, octyl acrylate, nonyl acrylate, decyl acrylate, isodecyl acrylate, tetradecyl acrylate, benzyl acrylate, nonyl phenyl acrylate, hexyl methacrylate, 2-ethylhexyl methacrylate, octyl methacrylate, nonyl methacrylate, decyl methacrylate, isodecyl methacrylate, dodecyl methacrylate, tetradecyl methacrylate, and octadecyl methacrylate may be used as the monomer for making regular membranes.

Functional monomers with quaternary ammonium groups may be used to make antimicrobial membranes. Nonlimiting examples of such monomers include [2-(acryloyloxy) ethyl] trimethylammonium chloride, (3-acrylamidopropyl) trimethylammonium chloride, [2-(methacryloyloxy)ethyl]trimethylammonium chloride, [3-(methacryloylamino)propyl] trimethylammonium chloride, and (vinylbenzyl) trimethylammonium chloride. When using a functional monomer, the final membrane preferably has quaternary ammonium groups on both its surface and in its bulk, thereby making the final membranes antimicrobial.

The family of dimethacrylate, diacrylate, and divinyl crosslinkers, including but not limited to ethylene glycol dimethacrylate, ethylene glycol diacrylate, poly(ethylene glycol) diacrylate (with different ethylene glycol repeating units), di(ethylene glycol) diacrylate, di(ethylene glycol) dimethacrylate, tetra(ethylene glycol) diacrylate, 1,3-butanediol diacrylate, 1,6-hexanediol diacrylate, 1,4-butanediol diacrylate, tri(ethyleneglycol) diacrylate, triethylene glycol dimethacrylate, poly(ethylene glycol) dimethacrylate (with different ethylene glycol repeating units), tetraethylene glycol dimethacrylate, 1,3-butanediol dimethacrylate, 1,6-Hexanediol dimethacrylate, 1,4-butanediol dimethacrylate, and divinylbenzene may be used as crosslinker. This crosslinking comonomer, or crosslinker, is preferably added to confer strength and resilience to the resulting membranes.

Thermal initiators such as azobisisobutyronitrile, benzoyl peroxide, tert-butyl peroxide, lauroyl peroxide, and cyclohexanone peroxide may optionally be used. Photo-initiators such as 1-hydroxycyclohexyl phenyl ketone, benzophenone, benzoin methyl ether, and benzoin isobutyl ether can optionally be used.

The block copolymers preferably comprise amphiphilic block copolymers such as poly(ethylene oxide)-b-poly(propylene oxide) block copolymers family, poly(ethylene glycol)block-polylactide methyl ether, poly(styrene)-block-poly(ethylene glycol), and poly(butadiene)-b-poly(ethylene oxide). The block copolymers' molecular weights may vary. Small molecule surfactants, such as dodecyltrimethylammonium bromide (DTAB), myristyltrimethylammonium bromide, trimethyloctadecylammonium bromide, trimethyloctylammonium bromide, cetyltrimethylammonium bromide (CTAB), and didodecyldimethylammonium bromide, are preferably not used.

Templates with different structures, such as lamellar, hexagonal, gyroid, or bicontinuous cubic, known as mesophases, are produced preferably by mixing block copolymer, deionized water, and the monomeric phase. At lab scale, all three phases are preferably mixed at once in a glass vial and centrifugation (2000 rpm) in alternative directions (1 minute for each direction) is preferably performed about 4 to 10 times until a transparent and homogeneous gel is obtained. At the industrial scale, a mechanical mixer with a high shear rate can be used to mix components. The mixture, preferably comprising formed mesophases, is preferably coated on a preferably nonwoven support (as shown in FIG. 1), preferably having a thickness of about 10 to 200 micrometers. Calendering, blade coating, casting, or any other coating method may be used. An ultraviolet (UV) light may optionally pre-polymerize the mesophases for 10 minutes; then the mesophases are subsequently heated at a temperature of about 60 to 75° C. is preferably provided to finalize the curing, preferably for about 2 to 4 hours.

Using a functional monomer, the final membrane of the present invention preferably comprises quaternary ammonium groups on both its surface and in its bulk. Quaternary ammonium groups can efficiently kill microbes; therefore, the final membranes are antimicrobial.

Example 1

Figure 2:
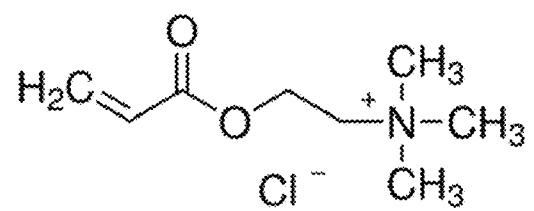
FIG. 2 shows the chemical structure of [2-(acryloyloxy) ethyl] trimethylammonium chloride.
Figure 3:
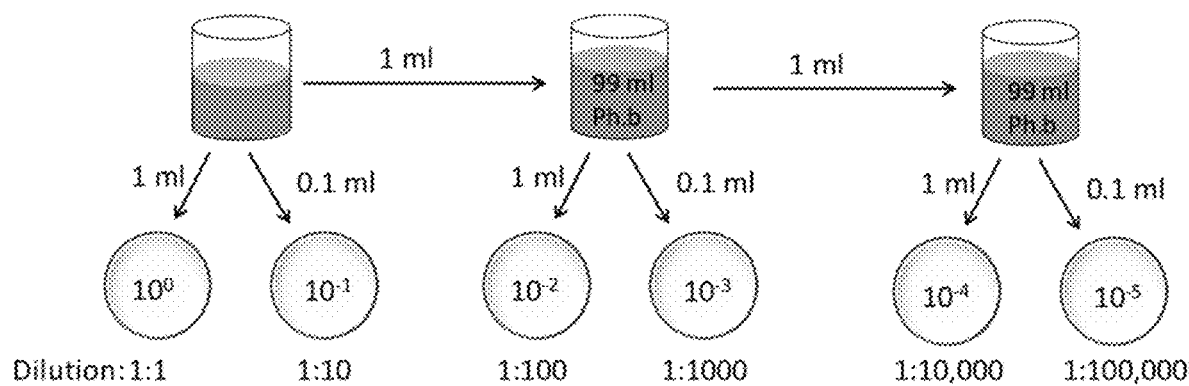
FIG. 3 shows the dilution steps used for making the PetriFilm samples of Example 1.
Figure 4A:
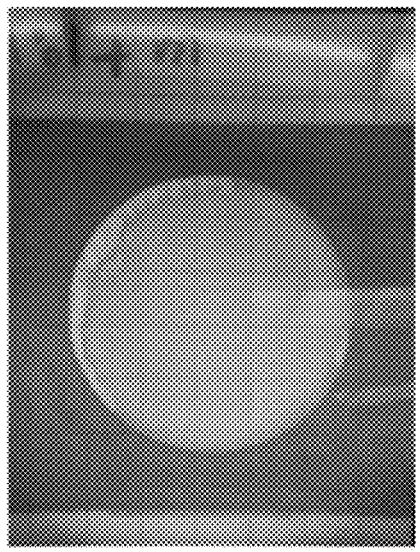
FIGS. 4A-4D show results from the growth of E. coli colonies on PetriFilms as described in Example 1 for: an as-synthesized membrane with a 1:1 dilution of wastewater (FIG. 4A), an as-synthesized membrane with a 1:10 dilution of wastewater (FIG. 4B), a control sample with a 1:1 dilution of wastewater (FIG. 4C), and a control sample with 1:10 dilution of wastewater (FIG. 4D).
Figure 4B:
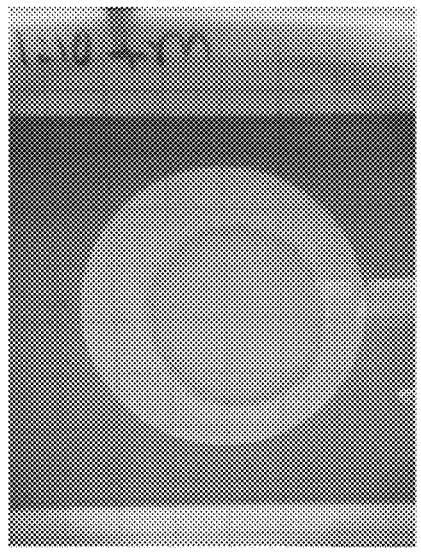
Figure 4C:
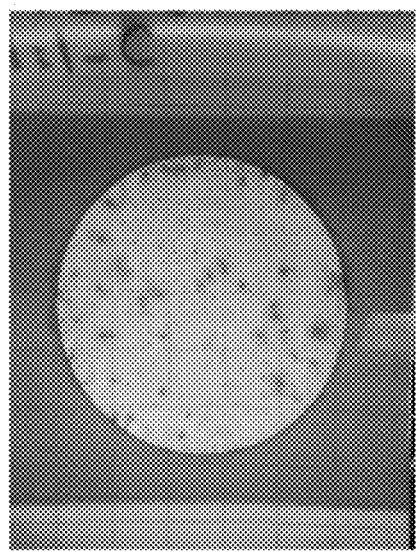
Figure 4D:
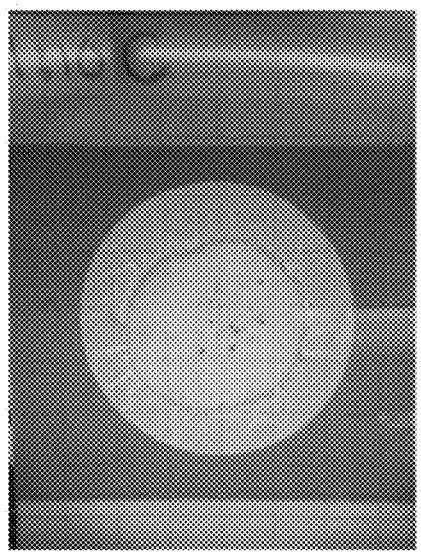

Several membranes were manufactured using [2-(acryloyloxy) ethyl] trimethylammonium chloride (AEAC), the structure of which is shown in FIG. 2, as the main monomer. This monomer comprises quaternary ammonium groups that make it antibacterial. *E. coli* count tests using 3M's Petri- Film E. coli counter were performed in order to test the antibacterial properties of the samples. To prepare the samples, as-synthesized membranes were kept in contact with a water sample containing E. coli for 1 hour. Then, a drop of the water sample was transferred to the middle of the PetriFilms. The control sample was the water sample without any contact with membranes. Different dilutions of water were used as shown in FIG. 3. All PetriFilm samples were kept in an incubator at 35° C. for 48 hours.

In order to inoculate the PetriFilms, several steps were followed. (i) A Petrifilm plate was placed on a level surface. (ii) The top film was lifted. (iii) A sample was measured using a micropipette, and with the pipette perpendicular to PetriFilm plate, 1 ml or 0.1 ml of the sample was placed onto the center of the bottom film. (iv) The top film was carefully rolled down to avoid trapping air bubbles. (v) With the flat side down, a spreader was placed on the top film over the inoculum. (vi) Pressure was applied gently on the spreader to distribute the sample evenly over a circular area. (vii) The spreader was lifted and the gel was given at least one min to solidify. (viii) The plate was incubated with the clear side up.

After 48 hours of incubation, the number of bacterial colonies in each Petrifilm was counted using a standard colony counter. FIGS. 4A-4D and Table 1 show the number of colonies in each sample. These results show that the as-synthesized membranes of the present invention kill almost all of the E. coli bacteria in the water sample.

TABLE 1

| Sample | # of colonies |
| --- | --- |
| 1:1 (control) | 560 |
| 1:10 (control) | 310 |
| 1:1000 (control) | 100 |
| 1:10,000 (control) | 30 |
| 1:100,000 (control) | 2 |
| 1:1 (membrane) | 2 |
| 1:10 (membrane) | 0 |
| 1:100 (membrane) | 0 |
| 1:1000 (membrane) | 0 |
| 1:10,000 (membrane) | 0 |
| 1:100,000 (membrane) | 0 |

Example 2

Figure 5:
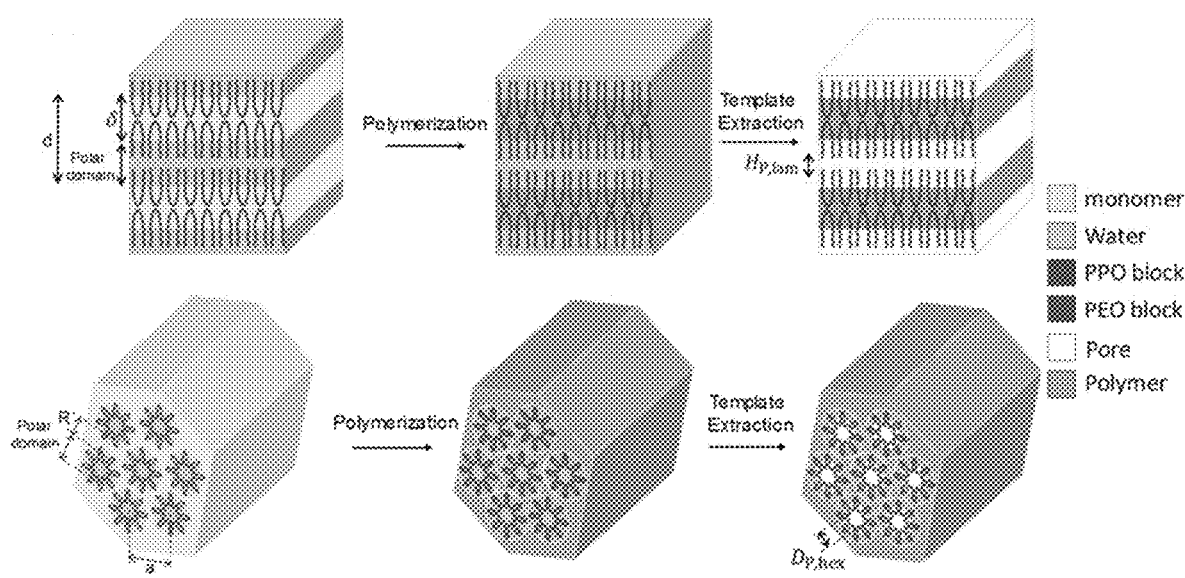
FIG. 5 shows schematic representations of a templating method of Example 2 for making mesoporous polymers using lamellar (top row) and hexagonal (bottom row) mesophases. The oil phase comprised monomer, crosslinker, and initiators. Lattice parameters, apolar and polar domain sizes, and pore sizes are shown.

Self-assembled mesostructures of a commercially available Pluronic® block copolymer, Pluronic® L64, in water and an oil phase consisting of monomers were employed as templates for the preparation of UF membranes without the need for organic solvents. Hexagonal and lamellar mesophases were prepared by changing the concentration of Pluronic® L64 and the water/monomer ratio. Polymerization of the monomer phase via a thermal/photo-initiation system followed by extraction of the aqueous phase generally retained the template structure, generating pores in the resultant membrane, as shown in FIG. 5. Membrane performance was found to be superior to that of a commercial NIPS UF membrane (GE, PT Series, PT8040F30) with similar pore size in terms of permeability, flux decline, and rejection of bovine serum albumin.

Pluronic L64, defined as poly[(ethylene oxide)13-block-(propylene oxide)30-block-(ethylene oxide)13] (Mw=2900 g/mol) was provided by BASF. Deionized (DI) water (0.055 µs/cm, EMD Millipore Direct-Q3) was used as the aqueous phase. Butyl acrylate (0.99%, Sigma-Aldrich) and ethylene glycol dimethacrylate (purified, Electron Microscopy Sciences) were used as the monomer and crosslinker, respectively. Azobisisobutyronitrile (AIBN, 98%, Sigma-Aldrich) and 1-hydroxycyclohexyl phenyl ketone (HCPK, 99%, Sigma-Aldrich) were used as thermal and UV initiators, respectively. Bovine serum albumin (BSA), from Sigma-Aldrich, was used as a solute for rejection tests. Poly (ethylene glycol) (PEG300, Sigma-Aldrich) was used as a model foulant. For molecular weight cut-off (MWCO) experiments, polyethylene glycol (PEG) with different molecular weights (200, 400, 600, 1000, 1500, 4000, and 6000 g/mol) were purchased from Alfa Aesar. All chemicals were used as received without further purification.

Pluronic L64, water, and an oil phase, which consisted of monomer, crosslinker, and initiator, were mixed in a glass vial via centrifugation. In this process, samples were repeatedly centrifuged (2000 rpm) and rotated until a transparent mesophase was obtained. It should be noted that this alternating centrifugation method is an effective mixing procedure and does not lead to phase stratification for mixtures wherein the components have similar densities, as is the case for the present system. Four different compositions or formulations for the synthesized membranes, shown in Table 2, were chosen based on the lamellar and hexagonal regions of a similar phase diagram shown in P. Alexandridis, U. Olsson, B. Lindman, Self-Assembly of Amphiphilic Block Copolymers: The (EO)13(PO)30(EO)13-Water-p-Xylene System, Macromolecules. 28 (1995) 7700-7710.

TABLE 2

| Membrane | Pluronic/water/oil [a] composition (wt. %) | Mesophase structure |
| --- | --- | --- |
| I | 60/30/10 | Lamellar |
| II | 50/35/15 | Lamellar |
| III | 60/15/25 | Hexagonal |
| IV | 55/15/30 | Hexagonal |

[a] The oil phase consisted of monomer, crosslinker, HCPK, and AIBN, where the crosslinker, HCPK, and AIBN concentrations were 33, 5, and 5 wt. % with respect to the monomer, respectively.

A cross-polarized Olympus microscope (model BX60) was used to characterize the liquid crystalline structure of mesophases before and after the polymerization. A small amount of each mesophase (before polymerization) was placed on a glass slide and covered with a glass cover slip. Cross-polarized images of samples were recorded using a microscope-mounted digital camera.

For mesophase characterization, small angle X-ray scattering (SAXS) samples were loaded into quartz capillaries with a nominal diameter of 1.5 mm (Charles Supper Company, Natick, Mass.) by centrifugation. Capillary tubes were then sealed using critoseal and epoxy glue (JB Weld). SAXS measurements were performed utilizing a Bruker Nanostar System with a monochromated Cu Kα radiation source. The beam center and sample to detector distance were determined using silver behenate. One-dimensional (1D) scattering profiles were produced through azimuthal integration of the two-dimensional (2D) scattering patterns.

To cancel effects arising from the membrane support, membranes were prepared using a polyethylene nonwoven fiber support recovered from the commercial UF membrane (GE, PT Series, PT8040F30; which is used for comparison) via a Soxhlet extraction with chloroform. Following removal of the polyethersulfone layer, recovered supports were dried under high vacuum for at least 24 hours and found to have an average thickness of 190 µm. A small amount of the unpolymerized mesophase (~2 mL) was subsequently placed onto the support such that the mesophase comprised roughly 60 wt. % of the final membrane.

Figure 6A:
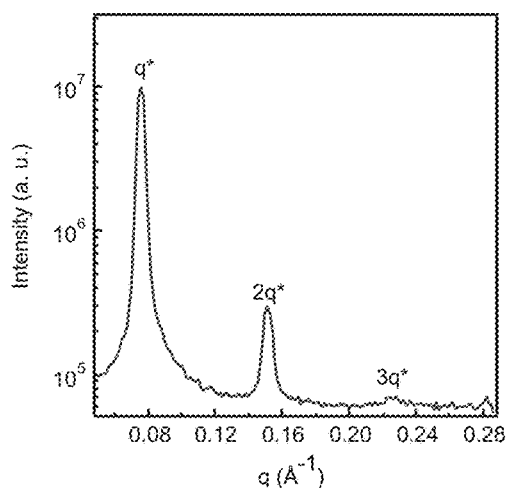
FIGS. 6A and 6B show 1-D SAXS profiles of the mesophase system of Example 2 comprising monomer (Pluronic L64/water/(butyl acrylate+EGDMA+HCPK+AIBN)) after polymerization, with and without a support, respectively.
Figure 6B:
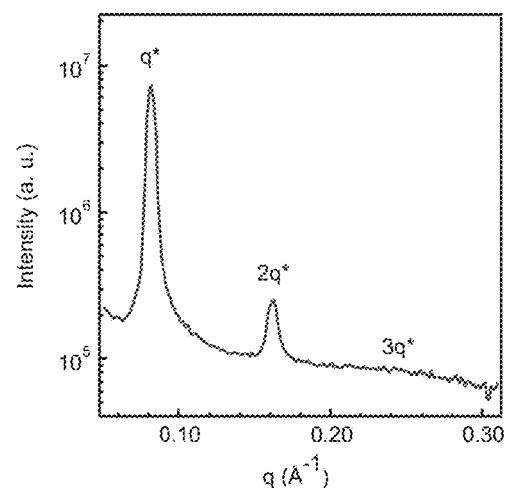

The gel mixture on the support was then sandwiched between Mylar sheets and smooth stainless-steel plates. The entire assembly was subsequently pressed using a hot press pre-heated to 40° C. with a force of $10^5$ N for five minutes, allowing the monomer mixture to completely infuse the support film. The film was then placed in a UV chamber (Spectroline Corporation, Select XLE-Series) for 2 hours where it underwent UV polymerization, after which it was transferred to a drying oven at 70° C. for 3 hours to ensure the polymerization was complete. It should be noted that the support material could easily be replaced with more renewable alternatives and is not believed to have a significant effect on the membrane nanostructure as evidenced by SAXS results from polymerized mesophases with and without the support, shown in FIGS. 6A and 6B.

After polymerization of the mesophases, SAXS measurements were performed as described above to investigate possible changes in the mesophase structure during polymerization. In addition, mesophases were polymerized while on a glass slide and imaged using cross-polarized light microscopy as described above to assess any changes to the mesophase structure during polymerization.

Membrane permeability was determined using a high pressure stirred cell (Sterlitech Corporation) in a dead-end filtration mode with stirring (750 rpm). Darcy's law was used to calculate the permeability as follows:

$$\frac{\kappa}{l} = \frac{Q\mu}{A\Delta P}$$

where Q, μ, A, ΔP, l, and κ are the flow rate, viscosity, membrane area, pressure difference along the membrane, membrane thickness, and Darcy's constant (intrinsic permeability), respectively. The ratio of κ/l was considered as an indication of operational permeability in this work due to modest thickness variation between synthesized membranes, which may bias direct comparisons between different membranes. DI water was filtered through the membranes under 1.5 bar applied $N_2$ pressure. Membrane effective area was constant in all samples, 14.6 $cm^2$. As noted previously, a commercial UF membrane (GE, PT Series, PT8040F30) with a molecular weight cut-off (MWCO) of 5 kDa (pore size of ~2.9 nm) was used for comparison in this study.

To evaluate membrane separation capability, a BSA solution was used as the feed. 1 mg/mL BSA solution in water was prepared and passed through membranes in a dead-end filtration mode with stirring (750 rpm). Concentration of solute in the feed and permeate were measured using a UV-Vis spectrophotometer (UV-1800, Shimadzu). Solute rejection (r) was calculated based on the following equation:

$$r = \left(1 - \frac{C_p}{C_f}\right) \times 100\%$$

where $C_p$ and $C_f$ are the concentrations of permeate and feed, respectively.

A Sterlitech cell was used to determine the fouling resistance of synthesized membranes. Solutions of 1 mg/mL BSA and 1 mg/mL poly(ethylene glycol) with a molecular weight of 300 g/mol (PEG300) were used as the feed. Fouling tests were performed over a period of 12 hours in the dead-end flow configuration. The 750 rpm stirring was used during the fouling tests. The permeate volume was collected in 10-30 min intervals. Permeate flux was calculated and plotted against collection time to assess the flux decline over time due to fouling.

To determine the MWCO of membranes, 1 mg/mL aqueous solutions of PEG with different molecular weights (200-6000 g/mol) were passed through them. A total organic carbon (TOC) analyzer (Shimadzu, TOC-L series) was used to determine the PEG concentration in the permeates, and the rejection values were calculated from the above equation. Each TOC measurement was performed 5 times and average values were reported. MWCO was defined as the molecular weight of the PEG molecule that gives a 90% rejection.

Figure 7:
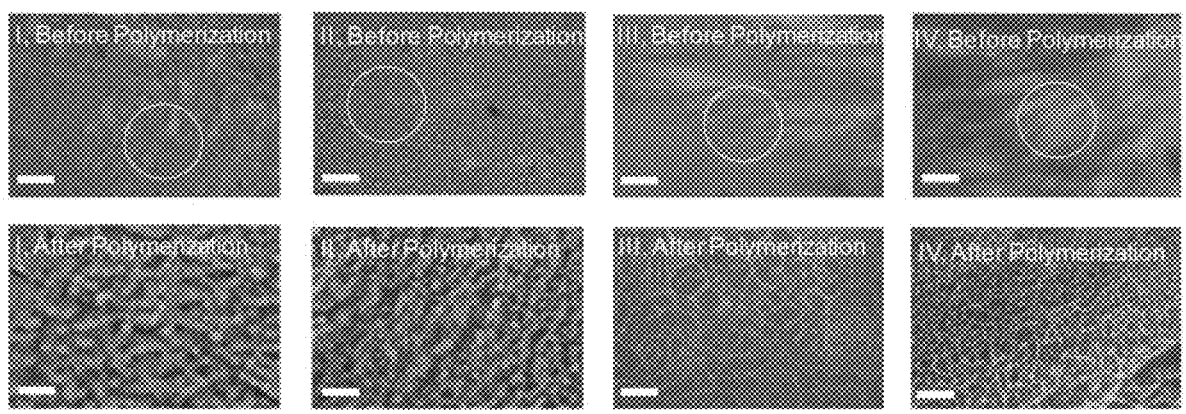
FIG. 7 shows cross-polarized light micrographs obtained for mesophases before and after polymerization with compositions I, II, III, and IV, as listed in Table 2. Scale bar: 50 µm.
Figure 8A:
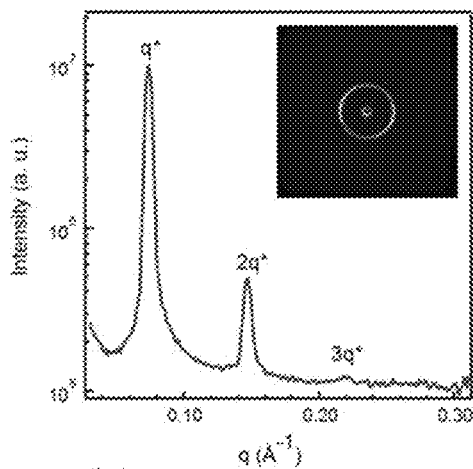
FIGS. 8A and 8C show 1D and 2D scattering profiles for composition I and III mesophases, respectively, before polymerization.
Figure 8B:
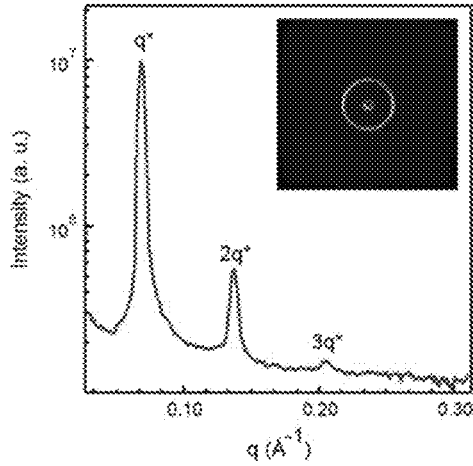
FIGS. 8B and 8D show 1D and 2D scattering profiles for composition I and III mesophases, respectively, after polymerization. The compositions are listed in Table 2.
Figure 8C:
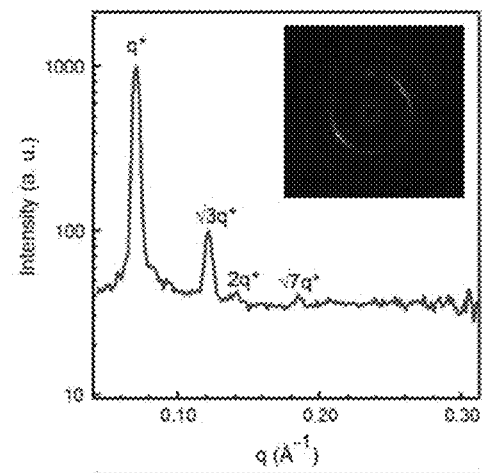
Figure 8D:
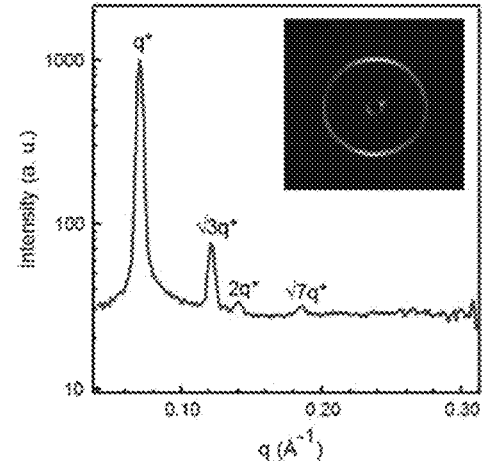
Figure 9A:
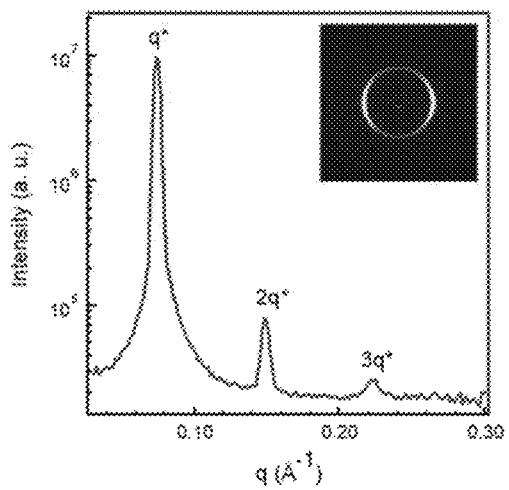
FIGS. 9A-9D show 1D and 2D SAXS profiles for mesophase systems containing a monomer comprising Pluronic L64/water/(butyl acrylate+EGDMA+HCPK+AIBN).
Figure 9B:
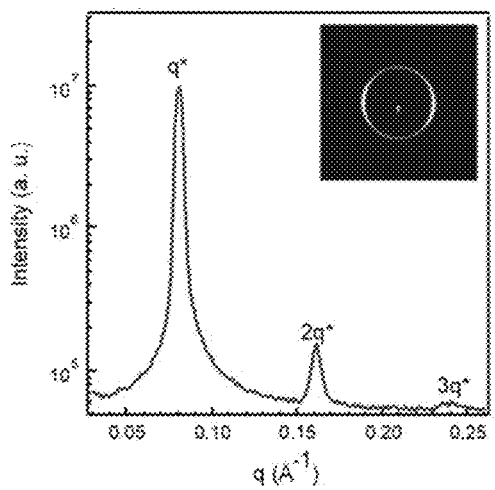
Figure 9C:
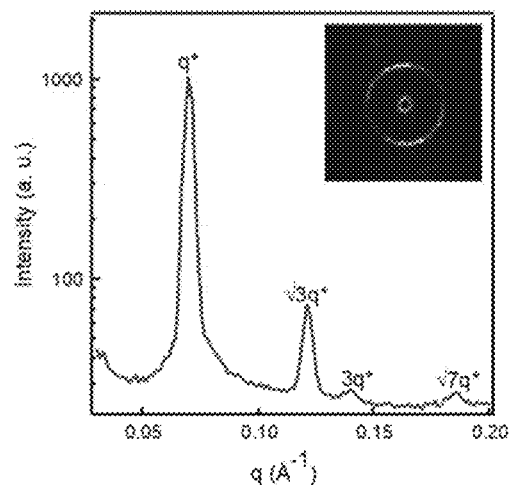
Figure 9D:
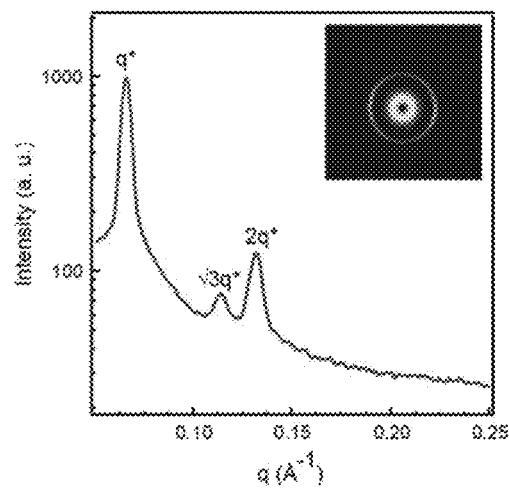
Figure 10:
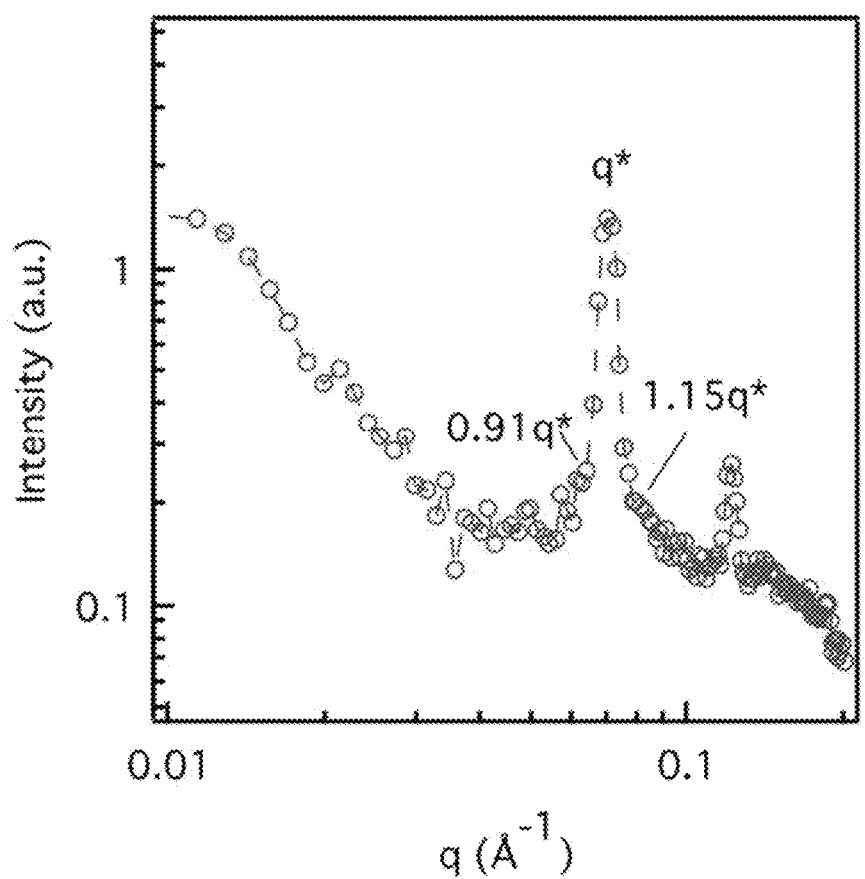
FIG. 10 shows a log-log scale 1D SAXS profile for a mesophase system containing a monomer (Pluronic L64/ water/(butyl acrylate+EGDMA+HCPK+AIBN)) with a 60/15/25 composition before polymerization. Pre- and post-shoulders in primary peak at $0.91q^*$ and $1.15q^*$ are indicative of HM/HPL structures.

Shown in FIG. 7 are cross-polarized micrographs obtained for mesophases before and after polymerization. The streaky oil textures highlighted in FIG. 7 for both samples I and II before polymerization are indicative of a lamellar structure, while the fan textures of samples III and IV are characteristic of hexagonal liquid crystals. Following polymerization, the absence of extinction (a dark image) indicates that the structure remains anisotropic. As such, these results suggest that all mesophases retain a birefringent structure after curing. SAXS measurements further validate this finding. SAXS data obtained for lamellar and hexagonal mesophases before and after polymerization are shown in FIGS. 8A-8D. FIGS. 8A and 8C correspond to compositions I and III, respectively, before polymerization. FIGS. 8B and 8D show scattering profiles for compositions I and III, respectively, after polymerization. Scattering profiles for compositions II and IV compositions can be found in FIGS. 9A-9D. Lamellar structures have 1:2:3:4 . . . relative peak positions (q/q*), while hexagonal mesostructures have relative peak positions of 1:√3:2:√7:3 . . . , where q* is the principle peak. Therefore, based on the scattering profiles presented in FIGS. 8A-8D and 9A-9D, samples I and II have a lamellar structure while samples III and IV appear to be hexagonal mesophases. It should be noted, however, that the anisotropy evident in the 2D scattering pattern displayed in the inset of FIG. 8C could indicate the presence of a hexagonal modulated (HM) or hexagonal perforated lamellae (HPL) phase, often found in close proximity to a purely hexagonal phase. This is further confirmed by the presence of pre- and post-primary shoulders in the 1D scattering profile, indexed in FIG. 10, which provide further evidence that the pre-polymerized mesophase observed for sample III is an HM/HPL structure. Despite this, as can be seen in FIG. 8D, upon polymerization sample III adopts a purely hexagonal morphology.

From the scattering profiles, the pore size of the mesophase-templated polymers can be determined using Bragg's law, 2d sin θ=nλ, where λ is the X-ray wavelength, θ is the scattering angle, n is the order of reflection (taken as 1 for the principal scattering vector, q*), and d is the lattice parameter. The magnitude of the scattering vector, q, is $$q = \frac{4\pi \sin\theta}{\lambda}$$

For a lamellar structure, the lattice parameter, d, also known as the lamellar periodicity, can thus be defined as follows:

$$d = \frac{2\pi}{q^*}$$

Further, for hexagonal mesophases, the lattice parameter, a, which is equal to the distance between the centers of adjacent cylinders, can be calculated as $$a = \frac{4\pi}{\sqrt{3}\, q^*}$$

Calculated lattice parameters for lamellar and hexagonal mesophases before polymerization (BP) and after polymerization (AP) are presented in Table 3.

TABLE 3

| Sample | Meso-phase structure | d or a (nm) BP | d or a (nm) AP | $\phi$ | δ or R (nm) BP | δ or R (nm) AP | $\varphi_w$ | $\varphi_M$ | Pore size (nm) |
|---|---|---|---|---|---|---|---|---|---|
| I | Lamellar | 8.5 | 9.2 | 0.48 | 4.1 | 4.4 | 0.30 | 0.11 | 2.8 |
| II | Lamellar | 7.4 | 7.8 | 0.46 | 3.4 | 3.6 | 0.36 | 0.16 | 2.8 |
| III | Hexagonal | 10.4 | 10.7 | 0.68 | 4.2 | 4.3 | 0.13 | 0.38 | 4.0 |
| IV | Hexagonal | 10.2 | 10.4 | 0.64 | 3.8 | 3.9 | 0.15 | 0.31 | 4.2 |

It can be seen that the lattice parameter increases upon polymerization. We can define the apolar domain volume fraction, $\phi$, as the volume fraction of the monomer phase and the PPO block, and the polar domain volume fraction, 1-$\phi$, as the volume fraction of water and the poly(ethylene oxide)(PEO) block. Knowing the lattice parameter and volume fractions, we can calculate the thickness of the apolar domain in the lamellar mesophases (δ) and in the hexagonal mesophases (R), illustrated schematically in FIG. 5, as follows:

$$R = a\left[1 - \left(\frac{\sqrt{3}}{\pi}(1 - \phi)\right)^{1/2}\right]$$

To calculate the volume fraction of each phase, we assume that the water, PEO, poly(propylene oxide) (PPO), and monomer phases are completely segregated and that each component is characterized by its bulk density. We note that this is not rigorously accurate, as the PEO and PPO will partition into the water and oil phases, respectively. However, these assumptions greatly simplify our calculations without losing a great deal of information. For Pluronic L64, the PPO block constitutes 60% of the block copolymer's weight. Assuming PPO and PEO to be at bulk density (PPO~1.005 g/cm³ and PEO~1.11 g/cm³), we can conclude that approximately 62% of polymer volume is the PPO block while PEO makes up the other 38% of Pluronic L64 volume. For the lamellar and hexagonal samples shown in FIGS. 8A-8D, the volume fraction of Pluronic L64 is thus 0.59 and 0.49 for samples I and III, respectively. Volume fractions of water, $\varphi_w$, and monomer phases, $\varphi_M$, in lamellar and hexagonal samples are reported in Table 3. The thickness or radius of the apolar domain was also calculated for each sample. This model is depicted schematically in FIG. 5.

To calculate the membrane pore size, we assume that the pores constitute the space left vacant by the removal of the water. The volume fraction of water, $\varphi_w$, in the polar domain of lamellar and hexagonal mesophases are reported in Table 3. The height of the rectangular pores in the lamellar samples, $H_{P,lam}$, and the diameter of cylindrical pores in the hexagonal samples, $D_{P,hex}$, can thus be calculated as follows:

$$H_{P,lam} = \varphi_w d$$

$$D_{P,hex} = a\left(\frac{\sqrt{3}}{2\pi}\varphi_w\right)^{1/2}$$

As shown in Table 3, all samples were found to have a pore size of less than 5 nm. Table 3 also shows that polymerization results in a modest increase in both the lattice parameter and apolar domain size. Both decrease and increase in the domain spacing upon polymerization have been reported in the literature. The former has been explained in term of a density change within the polymerized region, whereas the latter is attributed to changes in the original LLC structure. The observed increase in the domain size may be attributable to a competition between thermodynamics and kinetics. On one hand, as the polymerization proceeds, the molecular weight of the oil phase and consequently, $\chi N$, a measure of the enthalpic penalty of mixing, approaches infinity. This dramatic increase in the enthalpic penalty can drive the system towards phase separation, leading to an increase in the domain size. Changes in the surface energy of the polymerizing phase can also lead to a phase transition or inversion in the self-assembled structure. On the other hand, in our system, the polymerization results in a density increase (shrinkage with $\Delta\rho \sim 10\%$). Since cross-linking arrests molecular rearrangement, trapping the structure in a non-equilibrium morphology can be achieved if the self-organization kinetics of Pluronic are slower than the reaction kinetics. As such, the reaction kinetics and cross-linker content are of critical importance for limiting polymerization induced phase inversion/transition. Additionally, this explains the observed transition from an HM/HPL morphology to a hexagonal one. As shown in Table 3, expansion of the lattice parameter and apolar domain size is less significant when the monomer volume fraction increases. We attribute this to a higher shrinkage of the oil phase upon polymerization since the volume reduction is directly proportional to the overall concentration of the oil phase.

Figure 11:
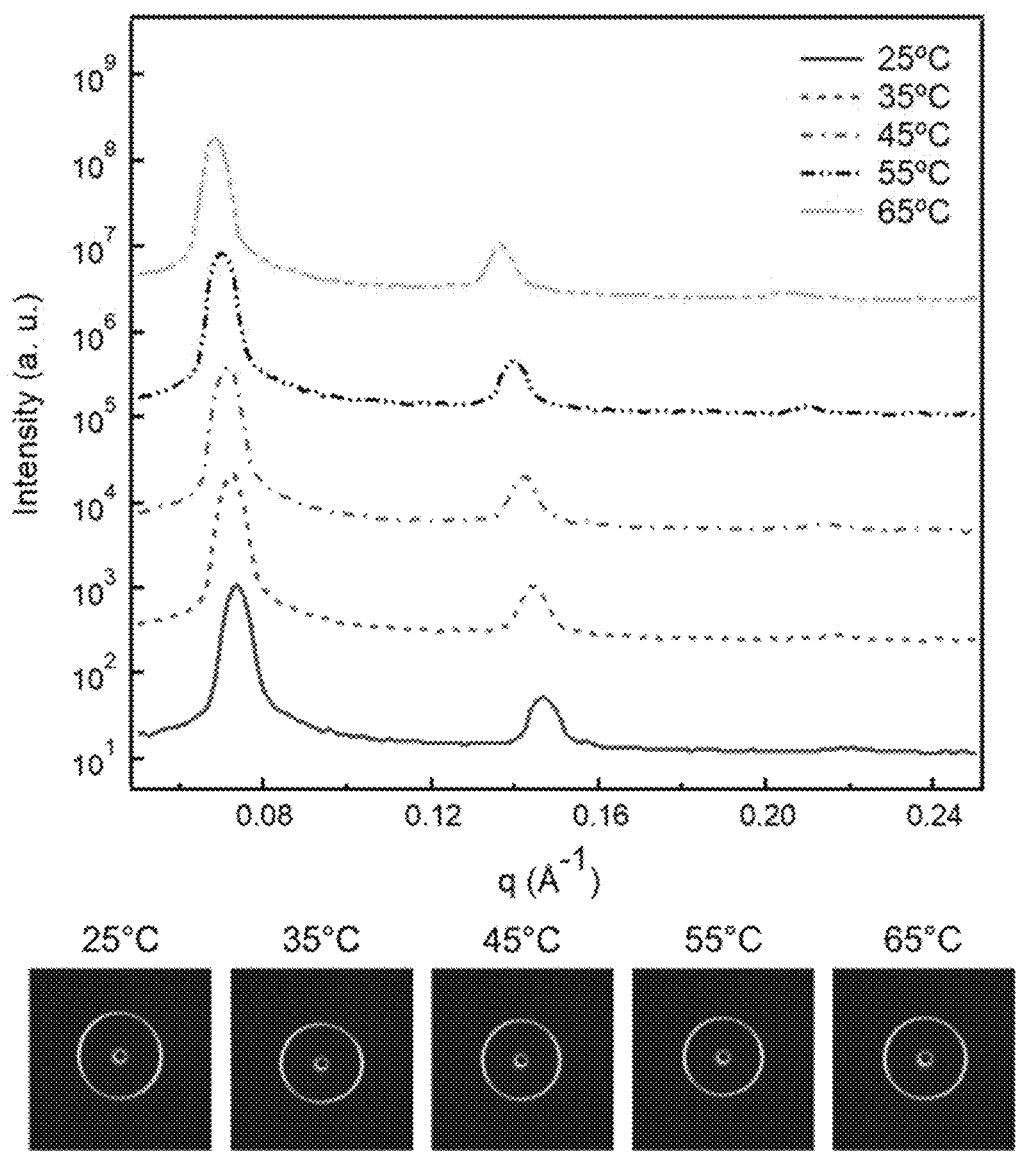
FIG. 11 shows 1D and 2D SAXS patterns as a function of temperature for sample I with composition of (Pluronic L64/water/(butyl acrylate+EGDMA+HCPK+AIBN) (60/30/ 10).

In contrast to the above discussion, a slight decrease or increase in the domain size with increasing temperature has been observed for the unpolymerized mesophases. It should be noted that this behavior is representative of the equilibrium self-assembly and not the morphology induced by the polymerization described above. It is evident from FIG. 11, which displays 1D SAXS profiles as a function of temperature for sample I, that the mesostructure appears stable during the temperature sweep and does not exhibit thermally induced phase separation (i.e. the measurement duration is shorter than the time required for polymerization). The observed decrease in the principal scattering vector (increase in domain size) with increasing temperature can be attributed to a change in the surface energy of the polymerizing phase. Additionally, this result provides evidence that the elevated temperature for the thermal initiation process should not have a significant effect on the nanoscale structure of the membrane. The limited morphological changes observed by SAXS and polarized light microscopy suggest that the wide stability window of the studied mesophases and rapid arrestment of morphological changes through crosslinking make this process fairly robust. This is a significant finding as elimination of polymerization induced phase separation generally requires the use of polymerizable surfactants. The method of the present invention is both scalable and flexible, utilizing a commercially available surfactant. Additionally, monomer chemistry and surfactants are easily adaptable, enabling production of membranes tailored in terms of surface chemistry and pore size.

TABLE 4

| Parameter | Unit | Commercial membrane [a] | Membrane I | Membrane II | Membrane III | Membrane IV |
|---|---|---|---|---|---|---|
| Q | L/hr | 0.12 ± 0.01 | 0.25 ± 0.01 | 0.24 ± 0.02 | 0.21 ± 0.03 | 0.22 ± 0.01 |
| k/l | $10^{-10}$ L/m$^2$ | 1.47 ± 0.01 | 3.05 ± 0.01 | 2.97 ± 0.01 | 2.60 ± 0.01 | 2.69 ± 0.01 |
| BSA rejection | % | <68% | >95% | >95% | >95% | >95% |
| Tortuous (effective) path length | — | N/A | (6.3 ± 0.30) ×10$^{-7}$ | (7.70 ± 0.7) ×10$^{-7}$ | (7.6 ± 1.2) ×10$^{-8}$ | (1.1 ± 0.1) ×10$^{-7}$ |

[a] The commercial membrane was a GE, PT8040F30.

The flow rate, normalized permeability, BSA rejection, and tortuosity of as-synthesized lamellar and hexagonal membranes compared to a commercial membrane are tabulated in Table 4. Both the lamellar and hexagonal membranes were found to have substantially higher permeabilities than the commercial membrane, with the lamellar membranes displaying the highest permeabilities despite a smaller characteristic pore size. The geometry of the nanostructure thus helps to determine the flow properties of the membranes. While lamellar mesophases impose 1D flow confinement (slit shaped channel), the flow in hexagonal structures is confined in 2D (cylindrical channels). Because 1D confinement provides more degrees of freedom for the fluid flow than 2D confinement, the higher permeability of lamellar membranes is expected.

Tortuosity, T, is defined as the ratio of effective path for water flow, $l_e$, to the thickness of the membrane, l, i.e. T=$l_e$/l. For randomly oriented lamellar and hexagonal channels, the tortuosity has been calculated as 1.5 and 3, respectively, whereas it is equal to 1 for perfectly aligned channels.

We can determine the tortuosity of membranes and shed light on the flux differences observed between lamellar and hexagonal mesophases. The permeation of water through lamellar and hexagonal channels is considered as water flow through a slit and a tube, respectively. Their corresponding volumetric flow rates are defined as follows:

$$Q_{e,lam} = \frac{\Delta P H_{P,lam}^3 W}{12\mu l_e}$$

$$Q_{e,hex} = \frac{\pi \Delta P D_{P,hex}^4}{128\mu l_e}$$

where $Q_{e,lam}$ and $Q_{e,hex}$ are volumetric flow rates for one channel in lamellar and hexagonal membranes with pore sizes of $H_{P,lam}$ and $D_{P,hex}$, respectively. $\Delta P$, $\mu$, and W are the pressure difference along the membrane thickness, water viscosity, and lamellar grain size (~0.1 μm, this estimate will be discussed later), respectively. $Q_{e,lam}$ and $Q_{e,hex}$ were calculated by dividing the total measured volumetric flow rates from Table 4 by the number of channels per membrane surface, N. For the lamellar and hexagonal structures, the number of channels per membrane surface are calculated as follows:

$$N_{lam} = \frac{A_m}{Wd}$$

$$N_{hex} = \frac{2A_m}{\sqrt{3}\,a^2}$$

where $A_m$ is the membrane area. Note this calculation assumes all channels are oriented as depicted in FIG. 5, whereas, in reality, some channels may be laying perpendicular to the surface. Effective path values for each membrane has been calculated in Table 4. At the same membrane thickness, the tortuosity value is proportional to the effective path. It can be seen that, despite exhibiting higher flow rates than their hexagonal counterparts (III & IV), the lamellar membranes (I & II) displayed a more tortuous path. This observation can be attributed to the difference in flow geometry.

Figure 12:
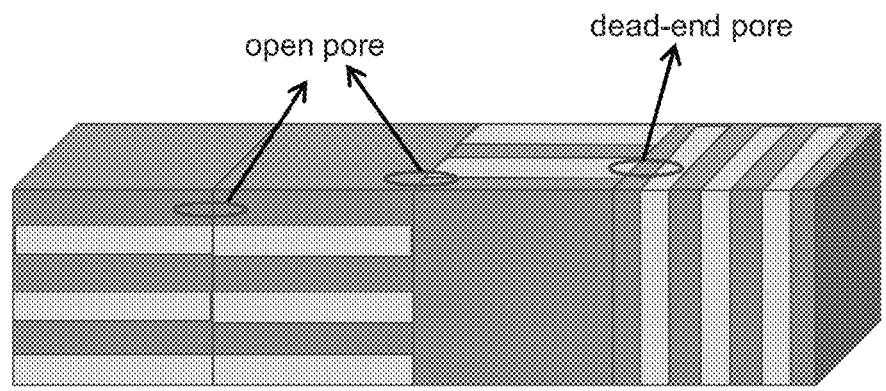
FIG. 12 is a schematic representation of grain boundaries that can lead to open or dead-end pores.

Grain boundaries in ordered phases can lead to dead-end pores and restrict flow, affecting the tortuosity, as shown schematically in FIG. 12. FIG. 5 shows only a single unit of each mesophase type. In reality, these units stack and may orient in different directions to form the ultimate structure. Using the Scherrer relation, $$\text{grain size} = \frac{5.56}{\Delta q},$$

we estimate the grain size across samples to be ~0.1 μm based on the full-width at half-maximum (FWHM) of the principal scattering peak ($\Delta q$). It should be noted that this calculation neglects the effects of paracrystallinity, temperature, and strain on the FWHM. Therefore, the grain size is likely underestimated in our calculation. Nonetheless, this calculation allows us to estimate that the membranes have on the order of 100 grains across the thickness of the membrane. In polymer blends containing ion-conducting domains, it has been shown that two out of three grain boundary orientations in lamellar structures were effective for ion diffusion, while just one out of three cylinder orientations in hexagonal structures was efficient. As such, the lower fluxes observed for the hexagonal mesophases over their lamellar counterparts can be rationalized by the higher probability of dead-ends at grain boundaries in hexagonal mesophases. Further, these results suggest that increasing the grain size relative to the membrane thickness, which can be accomplished via shear, thermal annealing, or mere reduction of the membrane thickness, can reduce tortuosity and therefore improve the permeability of the present membranes even further.

Figure 13A:
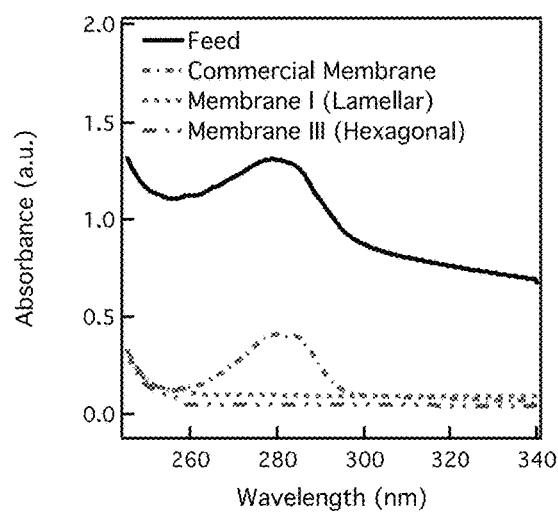
FIG. 13A shows a UV-Vis spectra of feed solution, permeate of membrane I (lamellar), and permeate of membrane III (hexagonal).
Figure 13B:
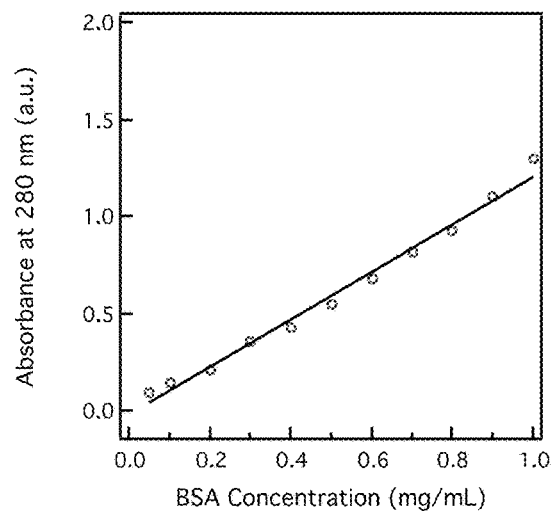
FIG. 13B shows a UV-Vis calibration curve of BSA.

To evaluate membrane separation performance, dead-end stirred cell filtration was performed with a 1 mg/mL BSA feed solution. UV-Vis results for the feed and permeate of commercial, lamellar (I), and hexagonal (III) membranes with a BSA feed solution are shown in FIG. 13A. A calibration curve for absorbance as a function of BSA concentration, shown in FIG. 13B, was determined and used to calculate the concentration of BSA in each stream. The minimum detectable concentration of BSA through this method was 0.05 mg/mL. It can be seen that neither I or III permeates displayed a noticeable peak at 280 nm. As a result, it can be concluded that BSA concentration in the permeates of these two membranes is less than 0.05 mg/mL. Therefore, BSA rejection for both lamellar and hexagonal membranes is greater than 95%. In contrast, the commercial NIPS membrane only displayed 68% BSA rejection.

Figure 14A:
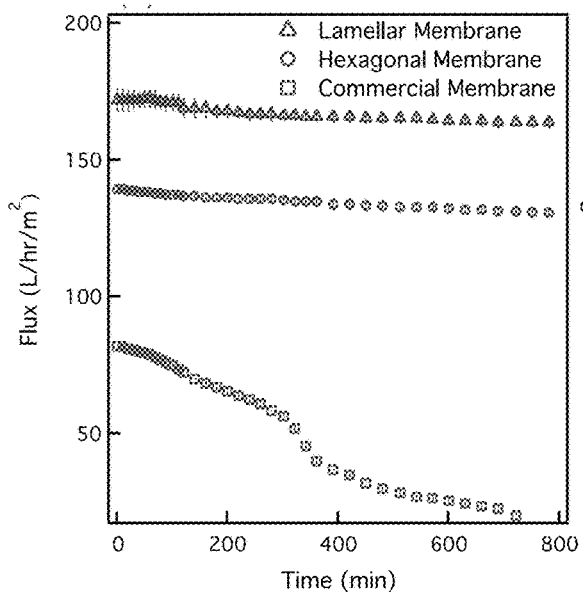
FIGS. 14A-14B show filtration of a 1 mg/mL BSA solution (FIG. 14A), and a 1 mg/mL PEG300 solution (FIG. 14B) through lamellar (I), hexagonal (III), and commercial membranes. Error bars indicate the standard deviation of three measurements.
Figure 14B:
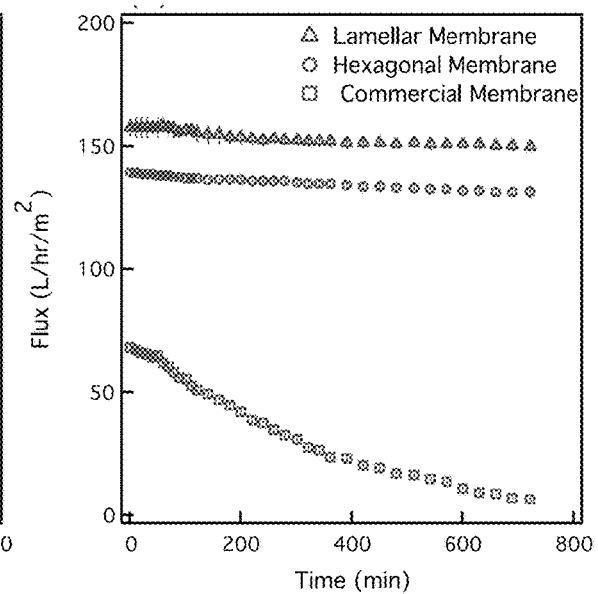

Additionally, the fouling resistance of lamellar (I) and hexagonal (III) membranes was measured and compared with the commercial membrane. Macromolecules and proteins are two of the primary foulants encountered in water filtration. As such, 1 mg/mL BSA and 1 mg/mL PEG300 solutions in DI water were used as foulants. Flux decline curves are shown in FIGS. 14A and 14B. Our results show that the flux declines slightly (only 6%) over 12 h for lamellar and hexagonal membranes, while there is a significant flux decline (89%) observed for the commercial membrane. These results indicate that, despite their small pore size (<5 nm), the present membranes display a superior fouling resistance (even in a dead-end configuration) when compared to a conventional NIPS UF membrane. This improvement can be attributed to the consistent pore structure throughout the present membranes, as well as the hydrophilicity of the Pluronic's PEG block decorating them, which is in stark contrast to the anisotropic structure of NIPS membranes. This anisotropy as well as the low surface porosity of NIPS membranes results in reduced fouling resistance. In addition, the fouling resistance of the present membranes is further enhanced by the hydrophilicity of the pore surfaces, due to retained PEG chains. Additionally, the similarity between the flux decay profiles for both BSA and PEG300 is striking considering BSA was found to be completely rejected, while the PEG300 was found to pass through the membrane (as will be discussed). This can be attributed in part to the high stir rate used during these experiments, which prevented a substantial over-layer of BSA from forming. However, the stark contrast between the present membranes and the commercial membrane suggest, as noted above, that the high fouling resistance of the present membranes also contributed.

Figure 15A:
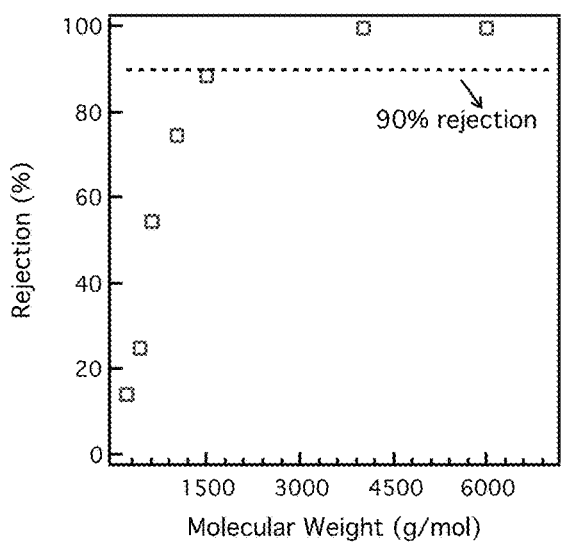
FIG. 15A shows the MWCO curve using the TOC method for an as-synthesized lamellar membrane (sample I)
Figure 15B:
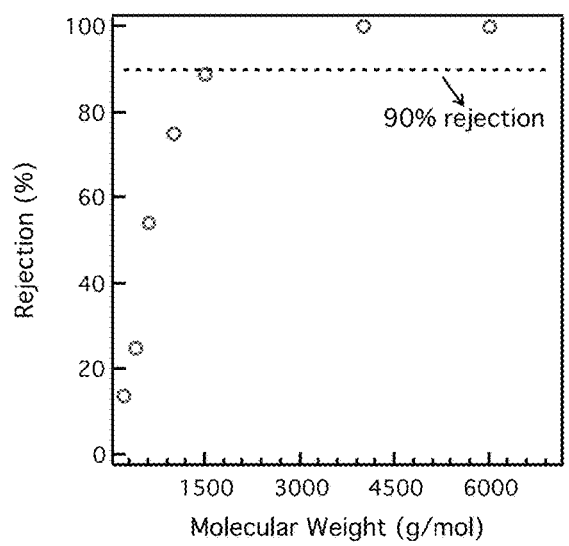
FIG. 15B shows the MWCO curve using the TOC method for an as-synthesized hexagonal membrane (sample III).

FIGS. 15A-15B shows the MWCO graphs for lamellar and hexagonal membranes. In both cases, the rejection values for M=1500 g/mol are greater than 89.5%. Thus, the MWCO is ~1500 g/mol. The PEG Stokes radius, $a_{Stokes}$ (nm), can be calculated as follows [39]:

$$a_{Stokes} = 16.73 \times 10^{-10} M^{0.557}$$

where M is the molecular weight of PEG. For M=1500 g/mol, the PEG diameter is 2.0 nm, which is close to the pore size of the membranes calculated in Table 3. This suggests that, as was assumed in the calculations above, the block polymer is retained in the pores. The modest difference between the calculated pore size and the separable solute size can be attributed in part to the assumption that the phases were completely segregated.

Figure 16:
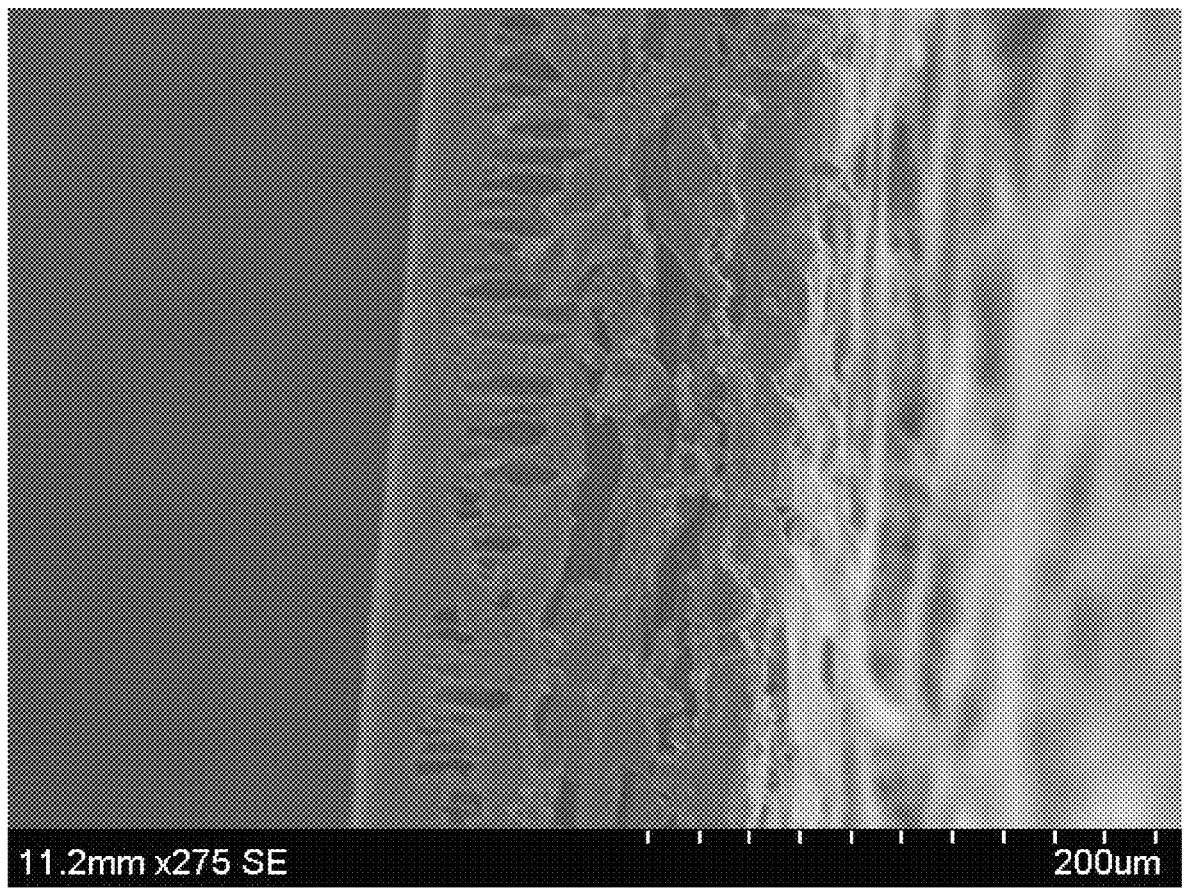
FIG. 16 is a cross-sectional SEM image for membrane I showing an average thickness of 10±2 µm.

FIG. 16 is a cross-sectional SEM image for membrane I showing an average thickness of 10±2 μm for the membrane.

In conclusion, self-assembled mesostructures of a surfactant in the presence of water and oil were used as templates for the production of UF membranes without the need for organic solvent. Cross-polarized light microscopy and SAXS confirmed the retention of hexagonal and lamellar mesophases after polymerization for most samples, with only a modest transition from a HM/HPL to a hexagonal morphology observed for sample with Pluronic/water/oil 60/15/25 composition. As-synthesized membranes were found to have excellent permeability with operational permeabilities double that of a commercial NIPS UF membrane. Additionally, the membranes exhibited MWCO of 1500 g/mol with exceptional rejection performance, >95% of BSA in a 1 mg/mL feed. Notably, the flux decline observed for both lamellar and hexagonal membranes with 1 mg/mL BSA and PEG300 solutions over 12 hr was minimal, indicating substantial fouling resistance. Consequently, it can be concluded that membranes produced via the present approach significantly outperform the commercial NIPS UF membrane used in this study. As such, these results, confirm that mesophase-templated membranes could provide an eco-friendly and more effective alternative to conventional NIPS UF membranes.

Note that in the specification and claims, "about" or "approximately" means within twenty percent (20%) of the numerical amount cited. As used herein, the singular forms "a," "an," and "the" include plural referents unless the context clearly dictates otherwise. Thus, for example, reference to "a functional group" refers to one or more functional groups, and reference to "the method" includes reference to equivalent steps and methods that would be understood and appreciated by those skilled in the art, and so forth.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A method of manufacturing a membrane, the method comprising:
   mixing a surfactant, an aqueous solution, and a solution comprising a monomer to form a mesophase, wherein the surfactant is different than the monomer;
   coating the mesophase on a porous support; and
   polymerizing the monomer to form a porous membrane on the porous support;
   wherein the surfactant is not polymerizable.

2. The method of claim 1 wherein the porous support is nonwoven.

3. The method of claim 1 performed without the use of an organic solvent.

4. The method of claim 1 further comprising removing the aqueous solution after the polymerizing step.

5. The method of claim 1 wherein the monomer solution further comprises a crosslinker and an initiator.

6. The method of claim 5 wherein the monomer is functionalized with an antibacterial group.

7. The method of claim 6 wherein the antibacterial group comprises a quaternary ammonium group.

8. The method of claim 5 wherein the initiator is a thermal initiator or a photo-initiator.

9. The method of claim 1 wherein the surfactant comprises a block copolymer.

10. The method of claim 9 wherein the block copolymer is a block copolymer of poly(ethylene oxide) and poly (propylene oxide).

11. The method of claim 9 wherein the block copolymer is amphiphilic, comprising hydrophilic blocks and hydrophobic blocks.

12. The method of claim 11 wherein the hydrophilic blocks form the surfaces of pores in the membrane.

13. The method of claim 1 wherein the surfactant does not comprise a small molecule surfactant.

14. The method of claim 1 wherein the aqueous solution is deionized water.

15. The method of claim 1 wherein the mixing step is performed via centrifugation.

16. The method of claim 1 wherein the polymerizing step comprises exposing the mesophase to ultraviolet radiation.

17. The method of claim 1 wherein the polymerizing step comprises heating the mesophase to a temperature below 100° C. for less than 5 hours.

18. The method of claim 1 wherein the membrane is antibacterial.

19. The method of claim 1 comprising choosing amounts of the surfactant, the aqueous solution, and the solution comprising a monomer in order to produce a predetermined structure of the mesophase.

20. The method of claim 19 wherein the structure is hexagonal or lamellar.

21. The method of claim 1 further comprising hot pressing the mesophase and the support to infuse the mesophase into the support prior to the polymerization step.

22. The method of claim 1 wherein a pore size of the membrane is less than approximately 5 nm.

23. The method of claim 1 wherein an average grain size of the membrane is approximately 100 nm.

24. The method of claim 1 wherein the membrane comprises monodisperse pores.

25. The method of claim 24 wherein surfaces of the pores are hydrophilic.

26. The method of claim 1 wherein the membrane is isoporous.

* * * * *